United States Patent
Azvedo et al.

(10) Patent No.: US 6,869,069 B1
(45) Date of Patent: Mar. 22, 2005

(54) ENGRAVING HOLDER

(75) Inventors: Joseph Azvedo, Pickering (CA); Richard Christopher Lux, Williamsville, NY (US); Alan Edward Nixon, Amherst, NY (US); Robin Sluce, Whitby (CA); Perry Welscher, Toronto (CA)

(73) Assignee: R.Q.C. Ltd., Buffalo, NY (US)

( * ) Notice: Subject to any disclaimer, the term of this patent is extended or adjusted under 35 U.S.C. 154(b) by 0 days.

(21) Appl. No.: 10/663,108

(22) Filed: Sep. 15, 2003

(51) Int. Cl.[7] .................................................. B25B 1/20
(52) U.S. Cl. ........................................ 269/40; 269/909
(58) Field of Search ............................ 269/40, 909, 43, 269/289 R, 302.1

(56) References Cited

U.S. PATENT DOCUMENTS

| | | | | |
|---|---|---|---|---|
| 2,588,810 A | * | 3/1952 | Dietrich | 269/40 |
| 4,459,772 A | * | 7/1984 | Kanzelberger | 40/745 |
| 4,942,742 A | * | 7/1990 | Burruel | 62/347 |
| 2004/0094043 A1 | * | 5/2004 | Morgan | 99/426 |

* cited by examiner

*Primary Examiner*—Lee D. Wilson
(74) *Attorney, Agent, or Firm*—Phillips Lytle LLP (57) ABSTRACT

An engraving holder (15) comprising a tray (16) adapted to be engaged by an engraving machine (18) and comprising at least one recess (19), the recess containing a mold (20), the mold comprising a cavity (21) adapted to hold an engraveable item (22) and having an inner surface (23) conforming to the shape of at least a portion of the outer surface (45) of the engraveable item. The tray may comprise multiple recesses containing multiple molds and the molds may have multiple cavities and the inner surfaces of the cavities may be of different shapes. The tray may have a recess that is defined by a bottom surface (24) and a side surface (32) extending from the bottom surface and may further comprise a notch (37) extending into the tray from the side surface. The notch (38a, 34e) may extend between the side surfaces (32a and 25e) of at least two recesses (19a and 19e) of the tray. The mold may be vulcanized rubber and the device may further comprise a jewelry item positioned in the cavity and an engraving machine.

4 Claims, 7 Drawing Sheets

ENGRAVING HOLDER

TECHNICAL FIELD

This invention relates generally to devices for holding items in alignment during an engraving operation and, more particularly, to a new device for holding jewelry items securely during engraving.

BACKGROUND ART

Because engraving provides a personal touch, there is a high demand for engraved jewelry items, which come in many different shapes, dimensions, sizes and configurations. Accordingly, many stores offer engraving services to customers. These stores have an engraving machine on site which allows the store to engrave items purchased at the store with letters or messages chosen by the customer.

Engraving machines come in a number of different styles, including automated machines. With such machines, the item to be engraved must be positioned on the engraving machine in a manner which holds it firmly enough that it will not slip or move during the engraving process. Movement of the item during the engraving process-will result in improper engraving. It is known to use a vice-like apparatus that clamps the item to be engraved in place in order to maintain it in the proper position for engraving. However, such devices take time to position and often do not properly hold irregularly shaped items, such as charms and other jewelry. Irregular items tend to be difficult to position in and tend to slip in such conventional holding devices.

Accordingly, there is a need for a jewelry item holder that will easily hold individual jewelry items in place during the engraving process.

DISCLOSURE OF THE INVENTION

With parenthetical reference to the corresponding parts, portions or surfaces of the disclosed embodiment, merely for purposes of illustration and not by way of limitation, the present invention provides an improved engraving holder (15) comprising a tray (16) adapted to be engaged by an engraving machine (18) and comprising at least one recess (19), the recess containing a mold (20), the mold comprising a cavity (21) adapted to hold an engraveable item (22) and having an inner surface (23) conforming to the shape of at least a portion of the outer surface (45) of the engraveable item. The tray may comprise multiple recesses containing multiple molds and the molds may have multiple cavities and the inner surfaces of the cavities may be of different shapes. The tray may have a recess that is defined by a bottom surface (24) and a side surface (32) extending from the bottom surface and may further comprise a notch (37) extending into the tray from the side surface. The notch (38a, 34e) may extend between the side surfaces (32a and 25e) of at least two recesses (19a and 19e) of the tray. The mold may be vulcanized rubber and the device may further comprise a jewelry item positioned in the cavity and an engraving machine.

Accordingly, the object of the present invention is to provide an improved holder for engraveable items.

Another object is to provide an improved holder which may be used to firmly hold oddly shaped jewelry items during the engraving process.

Another object is to provide an improved holder which may hold multiple items for engraving.

Another object is to provide an improved engraving holder which facilitates an automated engraving process.

Another object is to provide an improved holder which is molded to at least a portion of the engraveable item.

Another object is to provide an improved holder which may be securely engaged by the clamp of a conventional engraving machine.

Another object is to provide an improved holder that allows for engraving in large volumes.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
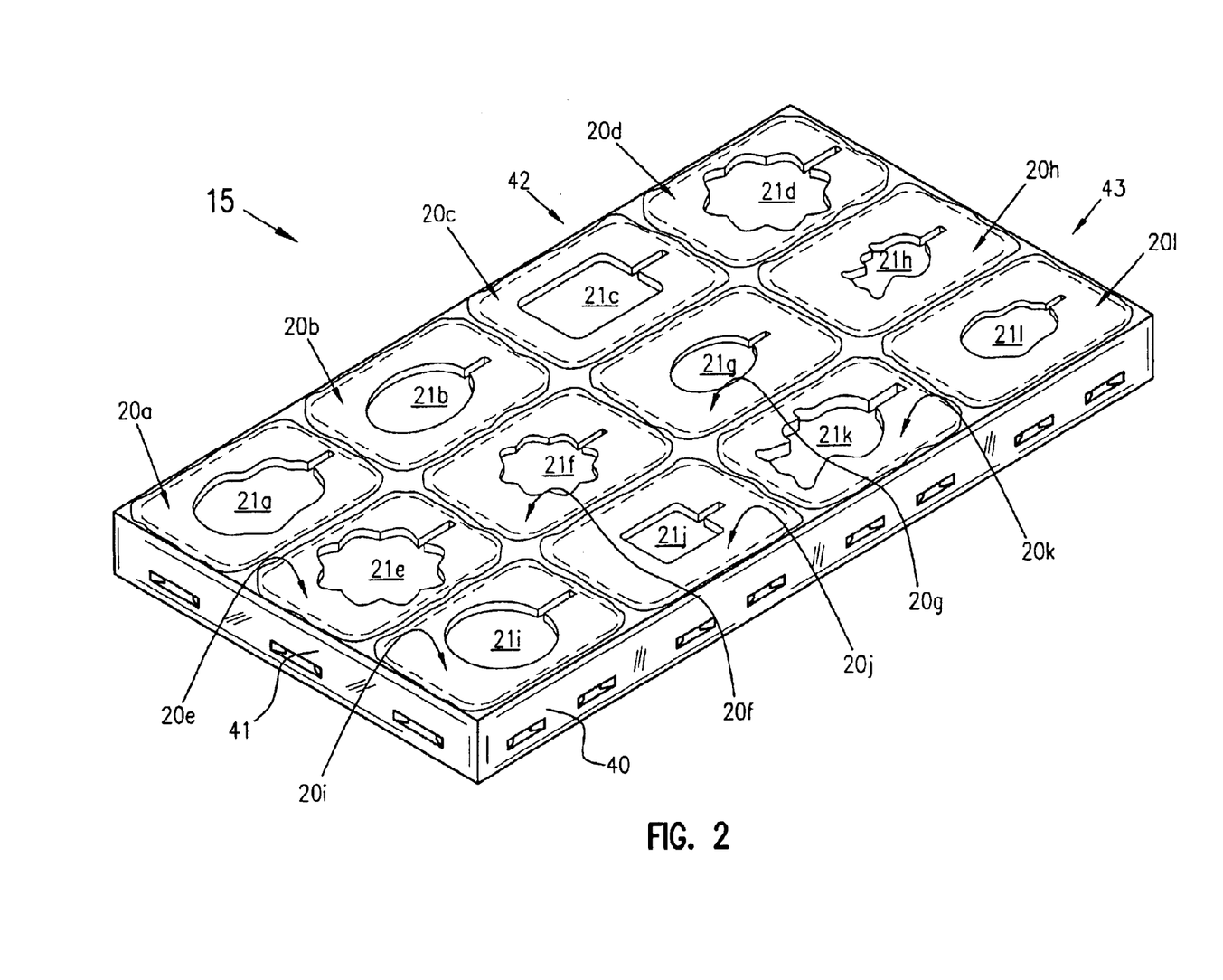
FIG. 2 is a perspective view of the engraving holder shown in FIG. 1.
Figure 3:
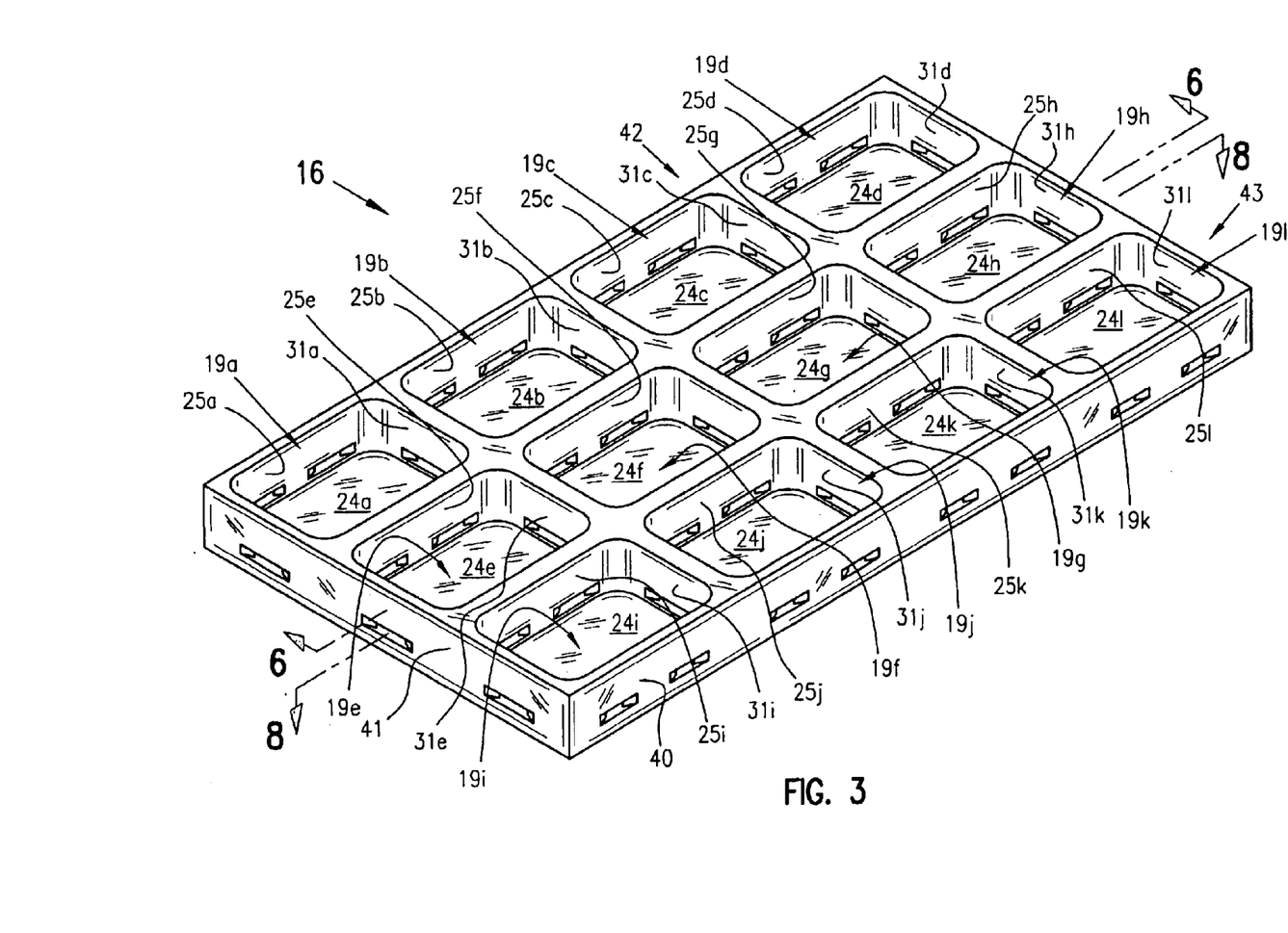
FIG. 3 is a prospective view of the tray shown in FIG. 2.
Figure 4:
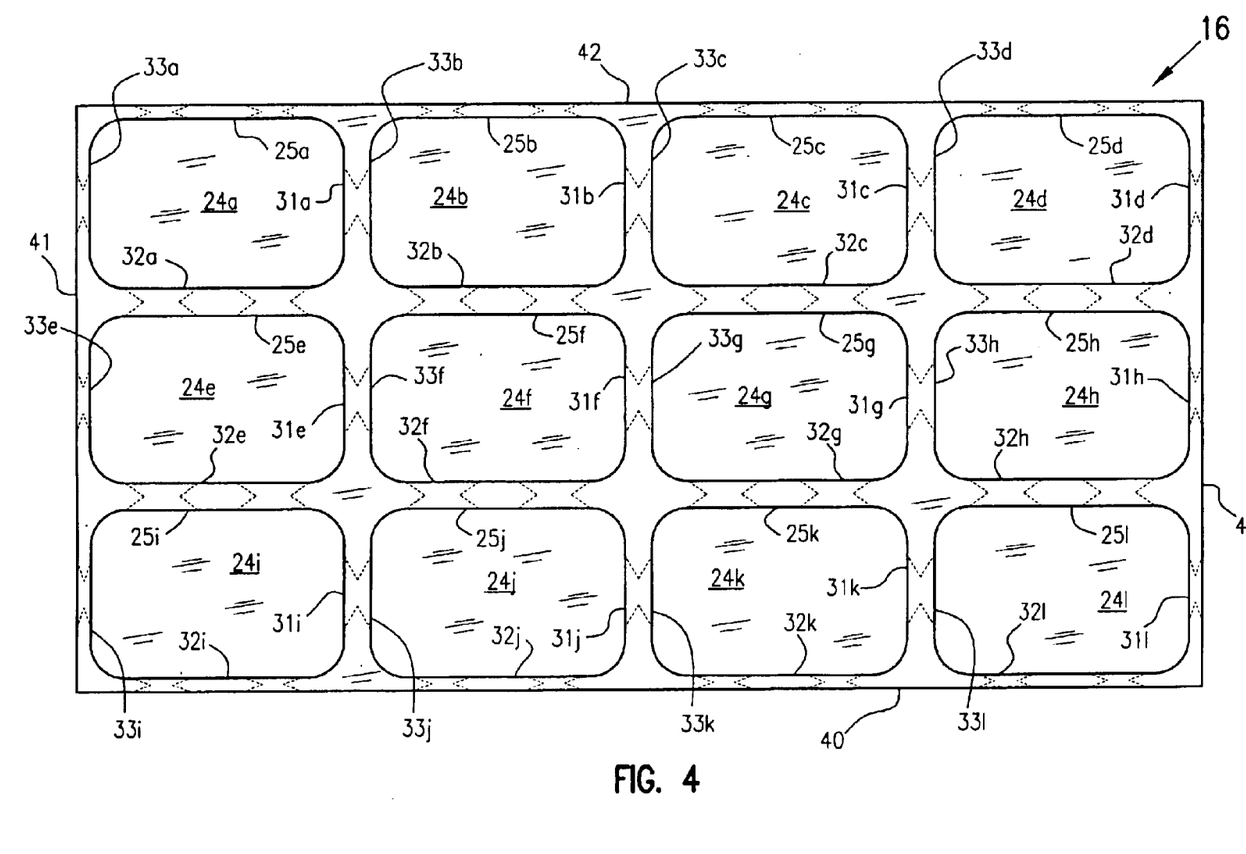
FIG. 4 is a top plan view of the tray shown in FIG. 3.
Figure 5:
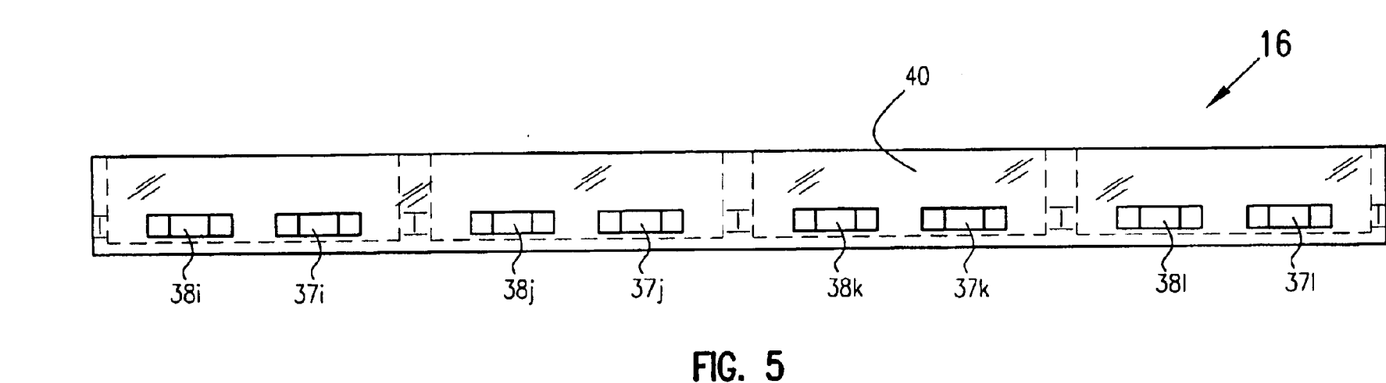
FIG. 5 is a front elevation of the tray shown in FIG. 3.
Figure 6:
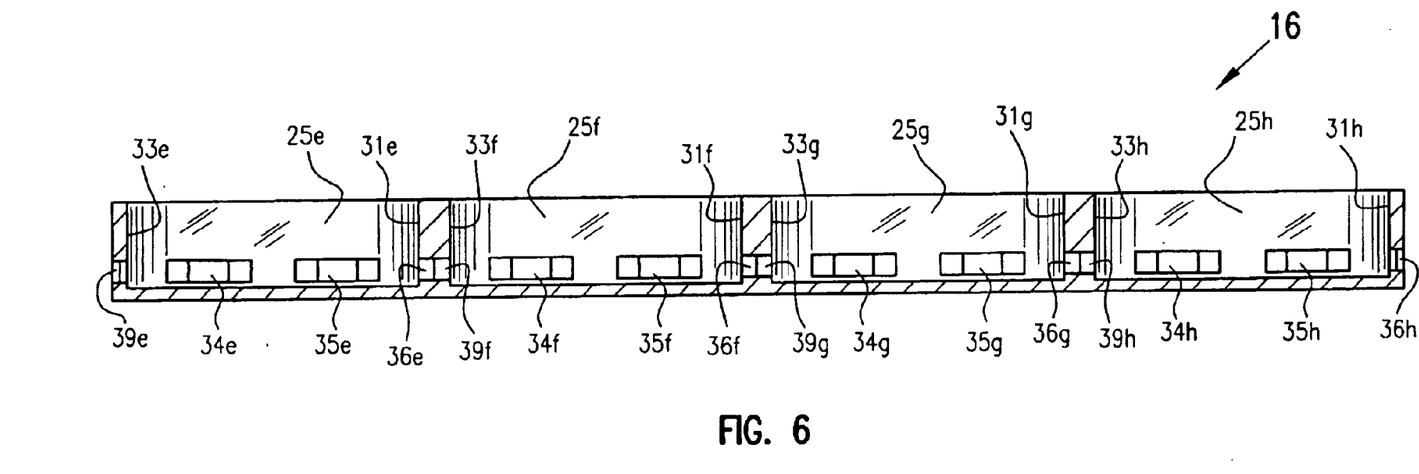
FIG. 6 is a vertical sectional view of the tray shown in FIG. 3, taken generally on line 6—6 of FIG. 3.

Referring now to the drawings, and more particularly to FIG. 2 thereof, this invention provides an improved engraving holder, the present preferred embodiment of which is generally indicated at 15. Holder 15 is shown as broadly including a tray 16 and multiple molds 20a–20l.

As shown in FIGS. 3–6 and 8, tray 16 is generally an aluminum rectangular solid member having four planar outer vertical surfaces 40–43 and twelve machined internal recesses or bays 19a–19l. Bays 19a–19l are arranged in tray 16 in three parallel rows of four bays each. Each of recesses 19a–l is defined by a bottom horizontal surface 24a–l and four vertical surfaces 25a–l, 31a–l, 32a–l and 33a–l connected at rounded corners. Each of bays 19a–19l includes 6 notches cut into the web of tray 16. Each of longitudinal vertical surfaces 25a–l has two notches 34a–l and 35a–l cut transversely into such surface. Each of transverse vertical surfaces 31a–l has a longitudinally extending notch 36a–l cut into such surface. Each of longitudinal vertical surfaces 32a–l has two notches 37a–l and 38a–l cut transversely into such surface opposite notches 35a–l and 34a–l respectively. Each of transverse vertical surfaces 33a–l has a notch 39a–l cut into such surface opposite notch 36a–l.

Figure 8:
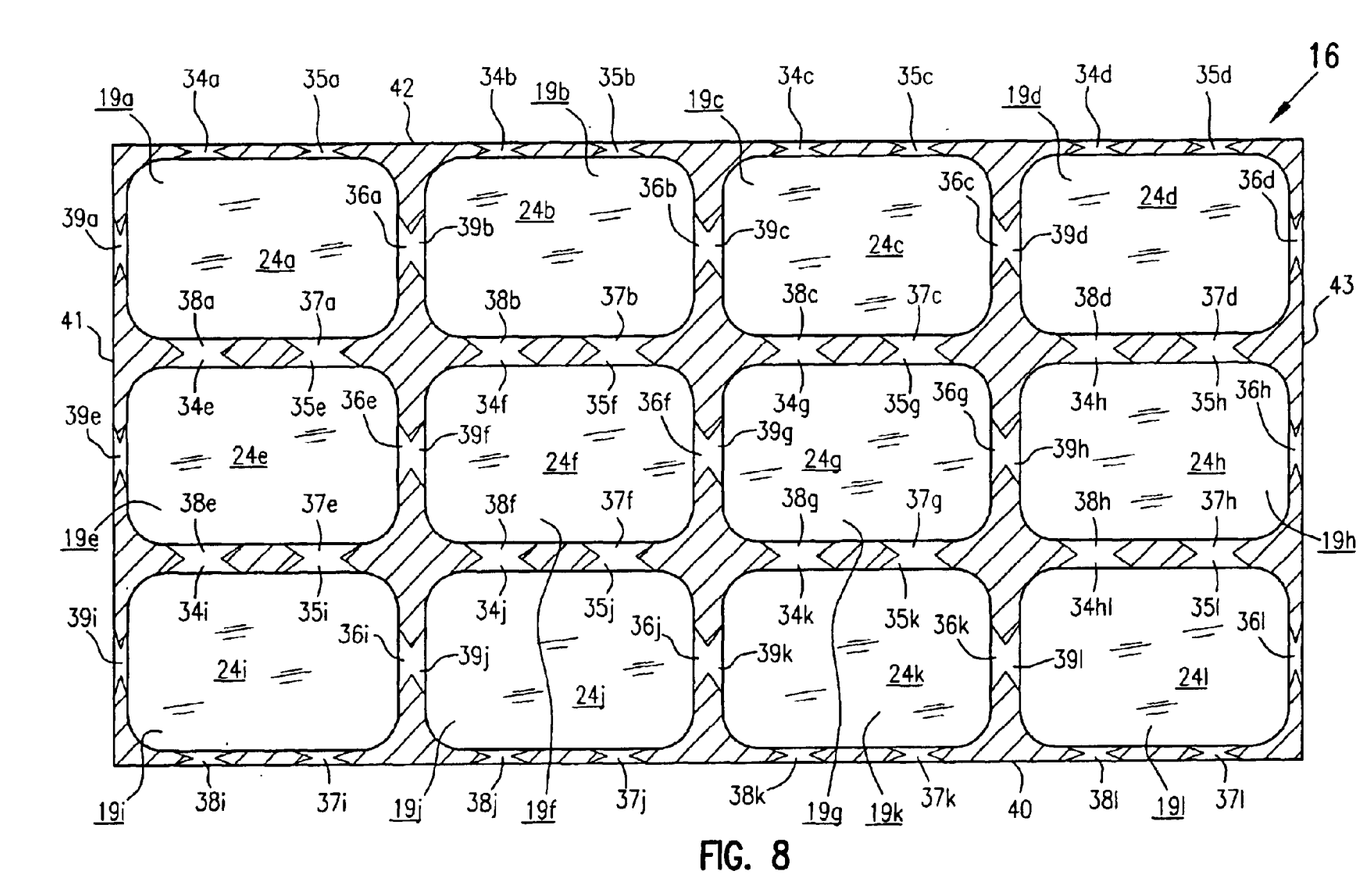
FIG. 8 is a horizontal sectional view of the tray shown in FIG. 3, taken generally on line 8—8 of FIG. 3.

As shown in FIG. 8, the combination of notches in adjoining bays 19a–19l create hourglass-like shaped passageways between the bays. For example, notches 36a and 39b define an hourglass-liked cross-sectionally shaped passage between bays 19a and 19b. Similarly, notches 37a and 35e form a first passage between bays 19a and 19e and notches 38a and 34e form a second passage between bays 19a and 19e. Thus, each of bays 19a–19l are connected through small tapered passages to adjoining bays. In addition, the bays on the outer perimeter of tray 16, namely bays 19a, 19b, 19c, 19d, 19e, 19h, 19i, 19j, 19k and 19l have at least one notch that extends from the bays inner surface to the outer surface of tray 16. For example, notches 34a and 35a extend all the way from the inner surface 25a of bay 19a through to the outer surface 42 of tray 16. Similarly, notches 34b and 35b extend from the inner surface 25b of bay 19b through to the outer surface 42 of tray 16. Notches 36d, 36h and 36l extend from inner surfaces 31d, 31h and 31l, respectively, through to outer surface 43. Notches 39a, 39e and 39i extent from inner surfaces 33a, 33e and 33i, respectively, through to outer surface 41 of tray 16. Notches 34a–l, 35a–l, 36a–l, 37a–l, 38a–l and 39a–l allow for rubber to fill through to the adjoining bay and to the perimeter of tray 16 and, when vulcanized, stiffen to anchor rubber molds 20a–l in place.

Figure 7:
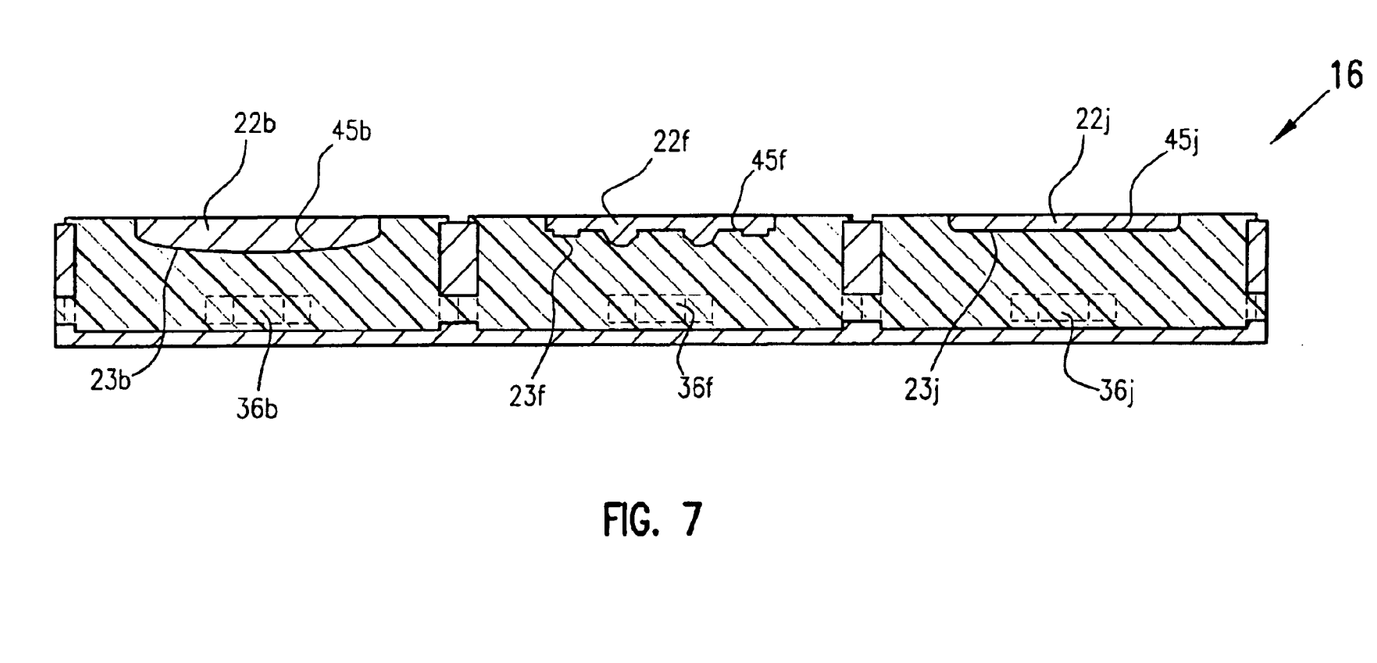
FIG. 7 is a vertical sectional view of the holder shown in FIG. 1, taken generally on line 7—7 of FIG. 1.

As shown in FIGS. 2 and 7, each of bays 19a–19l contains a mold 20a–20l. Each of molds 20a–l includes a cavity 21a–l. Molds 20a–l, including cavities 21a–l, are formed of vulcanized rubber. To form molds 20a–20l, strips of molding rubber are cut to fit into bays 19a–19l. The rubber is placed into each of these bays until each of the bays is filled to the top. Once the bays have been filled with the rubber, a properly aligned jewelry item is pressed into the top horizontal surface of the rubber in each bay. Differently configured jewelry items may be imprinted into different bays. A metal grommet may then be positioned in the rubber to provide for jewelry loops, the resulting slot space for the jewelry loop resembling a stem to the cavity. A flat metal plate is then positioned over the soft rubber and the jewelry items imprinted in the soft rubber. The metal plate is placed under pressure to hold it tightly against the properly aligned jewelry items imprinted in the soft rubber of molds 20a–20l and the top surface of tray 16. The plate and tray are then placed into a conventional vulcanization press with the iron set at 350° F. Tray 16, with bays 19a–l filled with the rubber, is vulcanized for approximately forty-five minutes to allow for the rubber to harden. The vulcanizer is then released, the tray is cooled, and the jewelry items are removed, forming cavities 21a–21l in molds 20a–20l, respectively.

As shown in FIG. 7, this process results in surfaces 23a–l of cavities 21a–l conforming to that portion of the outer surface 45a–l of jewelry items 22a–l that was imbedded in the soft rubber. Because the cavities are molded to the respective jewelry items, that type of jewelry item when placed into the cavity of the mold will be held securely and will not be likely to shift or move.

The soft rubber is pushed into bays 24a–l such that it will fill into notches 34a–l, 35a–l, 36a–l, 37a–l, 38a–l and 39a–l. When the rubber hardens in the vulcanization process, it is solidified in notches 34a–l, 35a–l, 36a–l, 37a–l, 38a–l and 39a–l and, because notches 34a–l, 35a–l, 36a–l, 37a–l, 38a–l and 39a–l extend perpendicular to vertical surfaces 25a–l, 31a–l, 32a–l and 33a–l of bays 19a–19l, the solidification of the rubber in the notches helps anchor molds 20a–20l in place and hold them from falling out of bays 19a–19l. Furthermore, because the internal notches connect the bays and create small passages between the bays, molds 20a–20l are interlocked together and held in place by the web of tray 16 around bays 24a–24l.

As shown in FIG. 7, each of cavities 21a–21l is configured to receive and hold a specially configured corresponding jewelry item 22a–l, and the contour of the surface 23a–l of cavity 21a–l is about the same as the contour of at least a portion of the outer surface 45a–l of jewelry item 22a–l.

The uniform shape of tray 16 simplifies the engraving process because each differently shaped jewelry 22a–l item is held by its corresponding mold 20a–20l in the internal bays 19a–l of tray 16 and tray 16 has an outer polygonal shape. Thus, the engraving machine must only be adapted to engage the outer vertical surfaces 40–43 of tray 16 and not the outer surfaces of the individual jewelry items placed in molds 20a–20l. With holder 15, the user need only clamp tray 16 in place with the clamping device of the engraving machine. This allows for reduced time for engraving as well as a more precise engraving process.

Holder 15 may be used with a number of various conventional engraving machines, including automated engraving machines. Conventional automated engraving machines allow for engraving of text or a design into a jewelry item without the requirement of a skilled engraver. Conventional automated engraving machines usually include a processor that controls the engraving operation and allows the operator to input the particular text and dimensions desired. The engraving machine then uses the inputted data and engraves the particular jewelry item.

Figure 1:
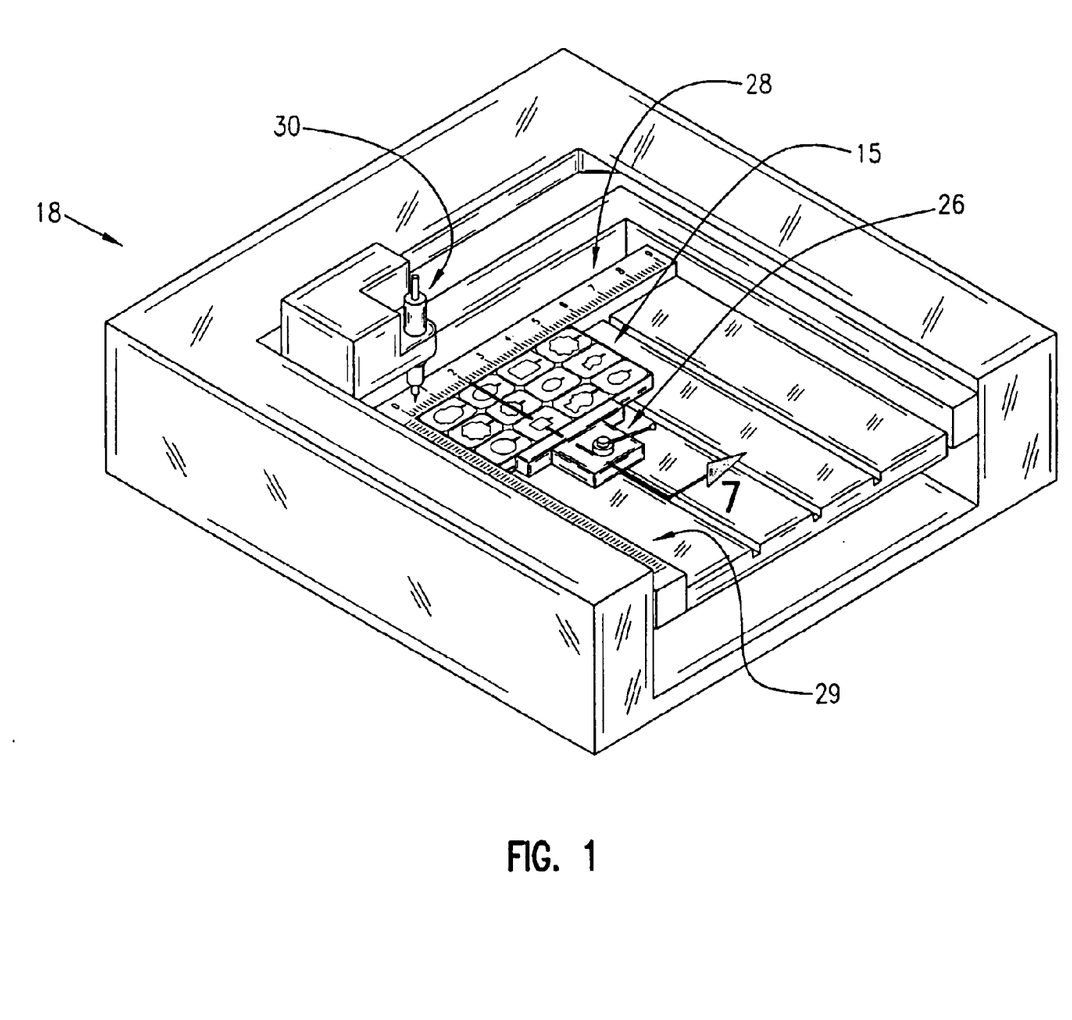
FIG. 1 is a perspective view of the engraving holder in engagement with a conventional engraving machine.

In the preferred embodiment, as shown in FIG. 1, automated engraving machine 18 may be programmed to engrave multiple jewelry items held by the multiple molds 20a–20l in tray 16. Thus, engraving machine 18 may be programmed by aligning and positioning tray 16 on the engraving table and setting the location for the center of the upwardly-facing surface of each jewelry item 22a–l held within cavities 21a–l. The center coordinates can be then set and saved as a template that may be used over and over again. Thus, numerous jewelry items may be engraved in one process, saving time and allowing for further automation.

In addition, molds 20a–20l are such that jewelry item 22a–l only fits properly in one orientation and this orientation allows for the proper alignment of engraving tool 30 with the engraveable top surface of jewelry item 22a–l. This decreases the chances that improper engraving will occur or that jewelry item 22a–l will be placed in engraving machine 18 such that the wrong surface is engraved. Thus, holder 15 allows for an automated alignment of the jewelry item with engraving tool 30 of engraving machine 18.

As shown in FIG. 1, holder 15 is placed into engraving machine 18. Jewelry items 22a–l are placed into cavities 21a–l, respectively. Tray 16 is aligned and set against the engraving table location stops or shoulders 28 and 29. Tray 16 is then locked in place with clamp 26. The engraving instructions are then programmed and the engraving process is initiated with jewelry items 22a–l held in molds 20a–l, respectively.

Because of the rectangular nature of tray 16, holder 15 can be held securely in place by the single clamp or vice 26 of conventional engraving machine 18. Contact between stops 28, 29 and clamp 26 and surfaces 42, 41 and 40, respectively, holds tray 16 in place in a vice-like fashion. The engraving tool 30 of engraving machine 18 then moves relative to tray 16 and the individual items 22*a–l* in holder 15 may be engraved in one continuous operation. Machine 18 is programmed such that engraving tool 30 centers on the top engraving surface of each item 22*a–l* held in engraving holder 15.

The Greyflo 2002 Silicone Wax Injection Molding Rubber manufactured by Millennium may be employed in the preferred embodiment. Engraving machine # 1212 manufactured by Vision Computerized Engraving Systems, of 17621 N. Black Canyon Highway, Phoenix, Ariz. 85023, may be employed in the preferred embodiment.

The present invention contemplates that many changes and modification may be made. The particular materials of which the various parts and component parts are formed may be varied. Dimensions of the preferred embodiment, including the cross-sectional shapes of the recesses and cavities may be altered to suit alternate cross-sectional jewelry items. In addition, the number of bays and cavities may be readily altered to allow for engraving a greater number of items at one time or to allow for only engraving one item at a time.

Therefore, while the presently preferred form of the holder or jig has been shown and described, and several modifications thereof discussed, persons skilled in this art will readily appreciate that various additional changes and modifications may be made without departing from the spirit of the invention, as defined and differentiated by the following claims.

What is claimed is:

1. A device for holding an item to be engraved comprising:
   a tray adapted to be engaged by an engraving machine and comprising;
   at least one recess;
   said recess is defined by a bottom surface and a side surface extending from said bottom surface;
   a notch extending into said tray from said side surface;
   said recess containing a mold;
   said mold comprising a cavity adapted to hold an engraveable item and having an inner surface conforming to the shape of at least a portion of the outer surface of said engraveable item.

2. A device for holding an item to be engraved comprising:
   a tray adapted to be engaged by an engraving machine and comprising;
   first and second recesses;
   each of said recesses defined by a bottom surface and a side surface extending from said bottom surface;
   a notch extending between said side surfaces of said recesses;
   each of said recesses containing a mold;
   each of said molds comprising a cavity adapted to hold an engraveable item and having an inner surface conforming to the shape of at least a portion of the outer surface of said engraveable item.

3. A device for holding an item to be engraved comprising:
   a tray adapted to be engaged by an engraving machine and comprising:
   first and second recesses;
   said recesses containing first and second molds, respectively;
   said first and second molds haveing first and second cavities, respectively;
   each of said first and second cavities adapted to hold an engraveable item and having an inner surface conforming to the shape of at least a portion of the outer surface of said engraveable item;
   wherein said respective inner surfaces of said first and second cavities are of a different shape.

4. A device for holding an item to be engraved comprising:
   a tray adapted to be engaged by an engraving machine and comprising;
   at least one recess;
   said recess containing a mold;
   said mold comprising a cavity adapted to hold an engraveable item and having an inner surface conforming to the shape of at least a portion of the outer surface of said engraveable item;
   wherein said mold is vulcanized rubber.

* * * * *